United States Patent [19]

Decker

[11] 4,197,102
[45] Apr. 8, 1980

[54] AIR PRE-CLEANER

[76] Inventor: Kenneth R. Decker, 920 N. Fremont St., Janesville, Wis. 53545

[21] Appl. No.: 967,566

[22] Filed: Dec. 8, 1978

[51] Int. Cl.² ............................................. B01D 45/12
[52] U.S. Cl. ...................................... 55/449; 55/457; 55/466
[58] Field of Search ................ 55/396, 397, 426, 449, 55/452, 456, 457, 466

[56] References Cited

U.S. PATENT DOCUMENTS

| | | | |
|---|---|---|---|
| 1,723,428 | 8/1929 | Kamrath | 55/449 |
| 2,304,778 | 12/1942 | Cresswell | 55/449 |
| 3,372,532 | 3/1968 | Campbell | 55/426 |
| 3,552,102 | 1/1971 | Araki | 55/457 |
| 3,670,480 | 6/1972 | Petersen | 55/449 |
| 3,740,932 | 6/1973 | Borsheim | 55/426 |
| 3,973,937 | 8/1976 | Petersen | 55/449 |

FOREIGN PATENT DOCUMENTS 197139  9/1957  Austria ...................................... 55/452

*Primary Examiner*—David L. Lacey
*Attorney, Agent, or Firm*—Howard M. Herriot

[57] ABSTRACT

An air pre-cleaner of the centrifugal type has a cylindrical housing with an annular louvred air entry structure at a first end thereof and coaxial therewith, and has an inner cylinder forming with the housing and the entry structure an annular separation chamber coaxial with, adjacent to, and axially inward of the entry structure. The inner cylinder forms with the housing a short cylindrical transfer chamber coaxial with, adjacent to, and axially outward of the separation chamber. A ring flange is disposed at the inner end of the inner cylinder along the inner ring of the annular separation chamber lying in a plane normal to the axis of the chambers. A dirt discharge slot is disposed in the side wall of the housing with one end of the slot substantially radially outward from the ring flange, the slot extending along a major portion of the axial length of the separation chamber. The ring flange extends radially outward from the inner end of the inner cylinder only a minor portion of the ditance from the inner cylinder to the side wall of the housing.

7 Claims, 5 Drawing Figures

AIR PRE-CLEANER

BACKGROUND OF THE INVENTION

Air pre-cleaners are used on the inlets of air cleaners to prevent coarse or fuzzy solid material, as dust, chaff, snow, lint and other particulate material from entering the air cleaner. If this material, hereinafter referred to as "dirt," is allowed to enter the air cleaner or the carburetor, it will impair the performance of the engine. An air pre-cleaner on the inlet to an air cleaner will reduce the frequency of service of the air cleaner where extreme dirt conditions are encountered. The pre-cleaner is used to separate the majority of the dirt from the incoming air stream thereby increasing the effective dirt collection capacity of the air cleaner.

Air cleaners of the centrifugal type have air deflecting structures which provide the air with a spiral motion to separate the dirt carried in the air. The cleaned air is drawn into the inlet of an engine. Examples of this structure are shown in the following U.S. patents: U.S. Pat. Nos. 451,139; 1,434,562; 1,607,744; 1,917,310; 2,226,045; 2,896,744; 3,382,651; 3,399,515; 3,670,480; 3,740,932; and 3,973,937.

SUMMARY OF THE INVENTION

The invention relates to an air pre-cleaner of the centrifugal type having an annular air entry louvred structure for admitting dirt-laden air into an annular-shaped separation chamber of a generally cylindrical housing, and giving the dirt-laden air a circumferential helical movement. The dirt is by centrifugal force thrown outward against the cylindrical side wall of the housing and is moved therealong around the wall to and out through a dirt discharge slot opening in that wall. The cleaned air is transferred radially inward from the annular-shaped separation chamber through a cleaned-air transfer chamber of short cylinder shape to the central zone of the housing, and from there is drawn axially out of the housing into the air intake of the air cleaner of an engine. The separation chamber and the transfer chamber are adjacent and co-axial. A ring flange is disposed at the junction of the transfer chamber and the separation chamber along the inner ring of the annular separation chamber, and lies in a plane normal to the axis of the chambers. One end of the dirt discharge slot is disposed substantially radially outward of said ring flange, and the slot extends parallel to the axis of the chambers and along a major portion of the axial length of the separation chamber.

DETAILED DESCRIPTION

Figure 1:
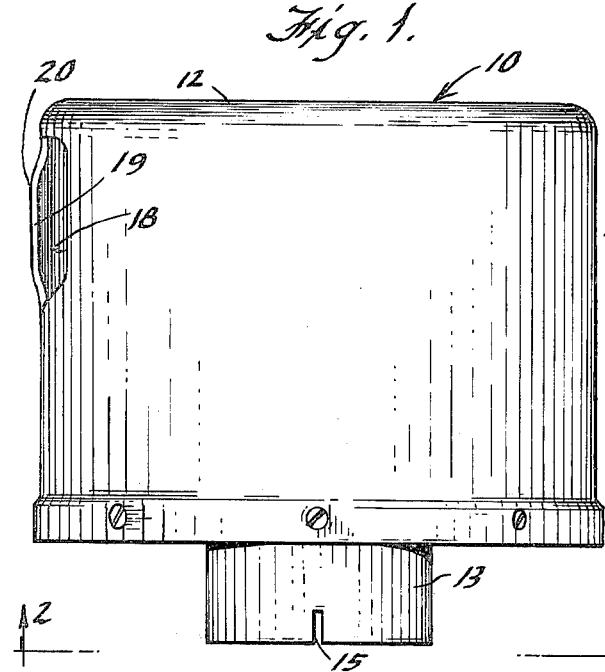
FIG. 1 is a side elevational view of an air pre-cleaner embodying the invention.

A cup-shaped housing 10 has a cylindrical side wall 11 and a closed end or top wall 12, and a plenum pipe 13 disposed coaxially with the housing and extending into and from the open end thereof, the inner end of the pipe 13 being spaced slightly from the closed end 12 as shown, and the outer end of pipe 13 having four slots 15 therein to facilitate connection to the air intake of an air cleaner of an internal combustion engine.

A ring flange 14 extends from the inner end of pipe 13 radially outward toward side wall 11 only a minor portion of the distance between the pipe and the side wall. The flange 14 lies in a plane normal to the axis of the housing and pipe.

A louvred air entry structure comprising a ring 16 and seven vanes 17 is disposed within the housing at the open end thereof between the pipe 13 and the side wall 11, and is bolted to the housing with machine screws as shown. The vanes are arranged as shown to give the entering dirt-laden air a circumferential helical movement as shown by the speckled arrows in FIG. 5, whereby the dirt is by centrifugal force thrown out to the side wall 11 and is moved therealong by that movement to and out of a discharge slot in the side wall as shown by the largest speckled arrow in FIG. 5. The clear (non-speckled) arrow in FIG. 5 shows the path of the cleaned air.

Figure 4:
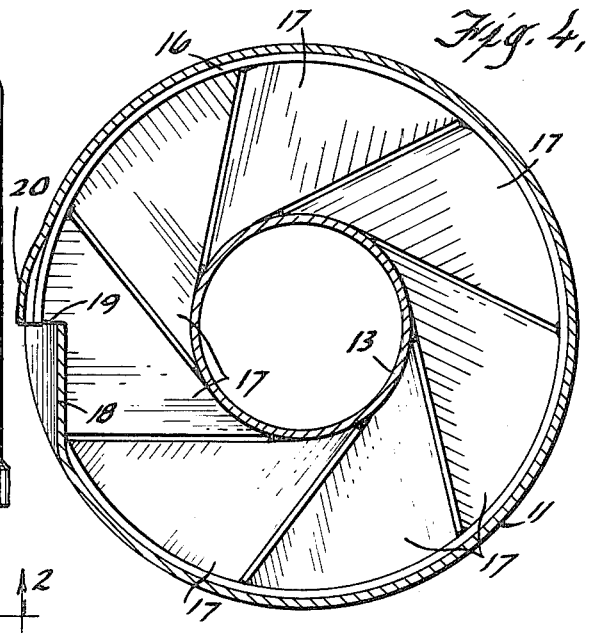
FIG. 4 is a horizontal section thereof taken along line 4—4 in FIG. 3.
Figure 2:
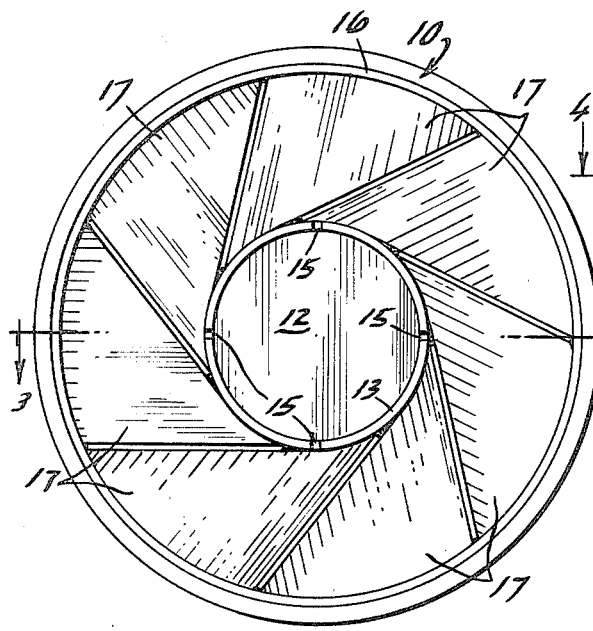
FIG. 2 is a bottom plan view thereof.

The discharge slot is an elongated slot formed by a slit in wall 11 as indicated at 19 and by a bent-in portion 18 of the wall and a bent-out portion 20 of the wall. The circumferential movement is in a counterclockwise direction in FIG. 4, the dirt thus discharging out the slot in a downward direction as viewed in FIG. 4.

The air flow through the pre-cleaner device, when the engine operates, is as follows: the air is drawn in through the louvred air entry into the annular separation chamber immediately thereabove and on into the pipe 13 at the inner end thereof (top end in FIGS. 3 and 5), and on through the pipe 13 and into the air inlet of the air cleaner of the engine.

Figure 3:
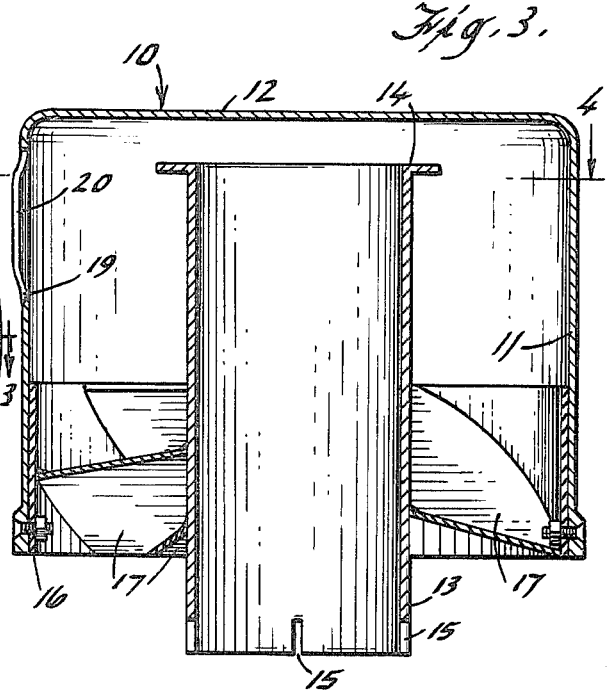
FIG. 3 is a vertical section thereof, taken along line 3—3 in FIG. 2.
Figure 5:
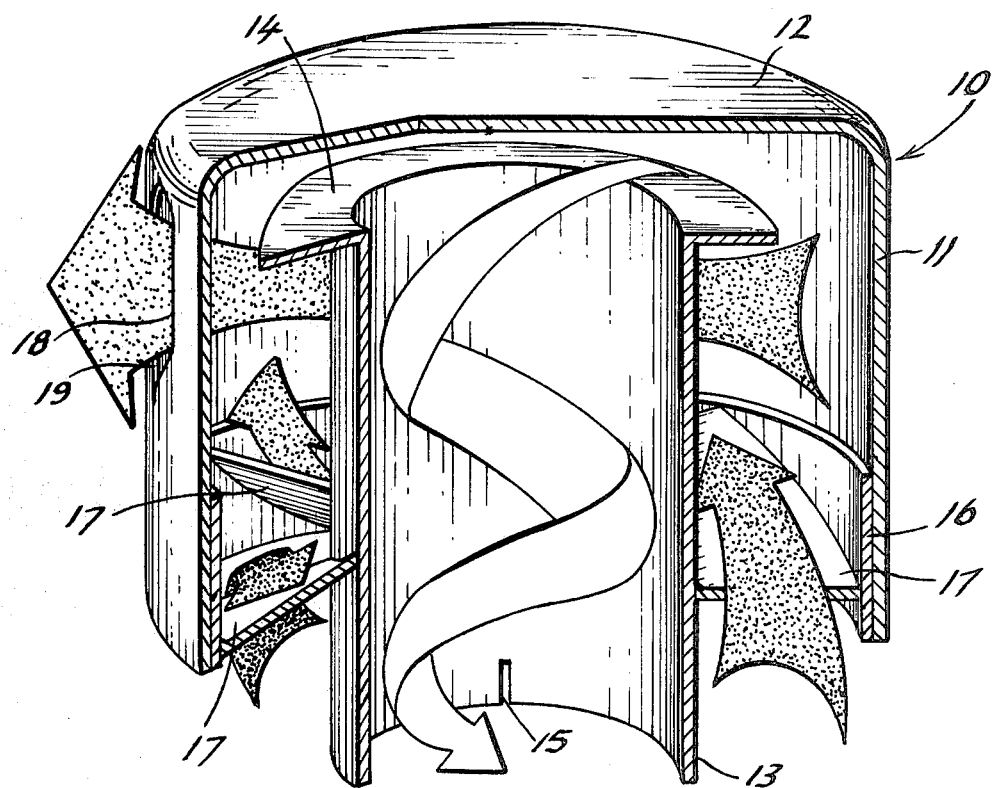
FIG. 5 is a perspective view thereof, with a portion broken away.

The cleaned air, as shown by the clear arrow in FIG. 5, and as can also be appreciated from FIG. 3, is moved radially inwardly in the short cylinder-shaped transfer chamber immediately above the annular-shaped separation chamber. It moves radially inwardly to the central zone above pipe 13 and thence moves axially (downwardly in FIGS. 3 and 5) through pipe 13 and out of the air pre-cleaner device into the air cleaner of the engine.

Referring to FIGS. 3 and 5, the device provides: an annular-shaped separation chamber immediately above and adjacent the louvred air entry structure, and immediately below and adjacent the ring flange 14; and a short cylinder-shaped cleaned air transfer chamber across the entire housing immediately above and adjacent the ring flange 14 and the annular separation chamber. The transfer chamber connects at its central zone with the plenum chamber inside plenum pipe 13. The axial length of the short cylinder cleaned air transfer chamber is about one-fifth of the axial length of the annular separation chamber; and the volume of the short cylinder cleaned air transfer chamber is about one-fifth of the volume of the annular separation chamber.

The radial width of the annular separation chamber is uniform. The ring flange 14 creates the only restriction in the gap between the pipe 13 and the side wall 11, and this restriction is only minor; the ring flange 14 extends a little less than one-fifth of the width of that gap. This very minor restriction is, however, very effective, located substantially radially aligned with the top end of the elongated dirt discharge slot and spaced slightly from the end wall 12 of the housing, being spaced therefrom a little less than one-tenth of the axial length of the housing 10. The transfer chamber thus has an axial length of a little less than one-tenth of that of the housing, the annular separation chamber has an axial length of a little over one-half of that of the housing, and the louvred entry structure has an axial length of a little over one-third of that of the housing. The dirt discharge slot has a length of about one-third of the axial depth of housing 10. The inside diameter of pipe 13 is about four-tenths of the inside diameter of housing 10.

The highly effective results of the air pre-cleaner are believed to be in large part due to the arrangement wherein the ring flange 14 extends substantially normal to the pipe 13 and housing side wall 11, extends only a minor portion into the gap between pipe 13 and side wall 11, and the top end of the dirt discharge slot is substantially aligned radially with ring flange 14 and is spaced from end wall 12 of the housing.

I claim:

1. An air pre-cleaner device comprising:
    a substantially cylindrical cup-shaped housing;
    a plenum pipe disposed co-axially of the housing extending into and from the open end thereof, the inner end of the pipe being only slightly spaced from the closed end of the housing;
    a ring flange at the inner end of the pipe lying in a plane substantially normal to the axis of the pipe and housing, and extending from the pipe only a minor portion of the distance between the pipe and the side wall of the housing;
    an elongated dirt discharge slot in the side wall of the housing, and the slot is positioned in said side wall such that the end of said slot located closest to said closed end is substantially aligned radially wth said ring flange spaced from the closed end of the housing about the same distance as is the ring flange, its long dimension being generally parallel to the axis of the pipe and housing and its short dimension being generally normal to the plane of the side wall of the housing; and
    a louvred air entry structure at the open end of the housing between the pipe and the side wall of the housing for admitting air and giving it a circumferential helical movement in the housing;
    whereby in operation the dirt in the admitted air is by centrifugal force thrown toward the side wall of the housing and is moved therealong by said movement to and out the dirt discharge slot, and the cleaned air is moved into the pipe at the inner end thereof and out of the pipe at the other end thereof.

2. The device of claim 1 wherein the ring flange extends a little less than one-fifth of the distance between the pipe and the side wall, and the pipe diameter is about forty percent of the housing diameter.

3. The device of claim 1 wherein: the pipe extends into the housing about ninety percent of the axial depth of the housing; the louvred air entry structure extends about a little over one-third of that depth; and the length of the dirt discharge slot is about thirty-three percent of that depth.

4. The device of claim 1 wherein: the ring flange extends a little less than twenty percent of the distance between the pipe and the side wall, and is spaced from the closed end of the housing a distance of about ten percent of the axial depth of the housing; the louvred air entry structure occupies a little over one-third of that depth; and the dirt discharge slot has a length of about one-third of that depth.

5. The device of claim 1 wherein the pipe diameter is about four-tenths of the housing diameter.

6. An air pre-cleaner device comprising:
    a substantially cylindrical cup-shaped housing;
    a plenum pipe disposed co-axially of said housing extending into and from the open end thereof, the inner end of the pipe being spaced from the closed end of said housing;
    a ring flange at the inner end of said pipe lying in a plane substantially normal to the axis of said pipe and said housing, and extending from said pipe only a minor portion of the distance between said pipe and the side wall of said housing;
    a louvred air entry structure at said open end between said pipe and said side wall for admitting air and giving it a circumferential helical movement in said housing; and
    an elongated dirt discharge slot in said wall between said closed end and said louvred air entry structure and the end of said slot which is located closest to said cover is substantially aligned radially with said ring flange;
    whereby in operation the dirt in the admitted air is by centrifugal force thrown toward the side wall of the housing and is moved therealong by said movement to and out the dirt discharge slot, and the cleaned air is moved into the pipe at the inner end thereof and out of the pipe at the other end thereof.

7. The device of claim 6 wherein the inner end of said pipe, and the ring flange, are spaced only slightly from said closed end.

* * * * *